(12) United States Patent  
Lemoff

(10) Patent No.: US 6,678,436 B2
(45) Date of Patent: Jan. 13, 2004

(54) OPTICAL SWITCH WITH MOVING LENSES

(75) Inventor: Brian E. Lemoff, Union City, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/872,120

(22) Filed: Jun. 1, 2001

(65) Prior Publication Data

US 2002/0181836 A1 Dec. 5, 2002

(51) Int. Cl.⁷ .............................. G02B 6/26; G02B 6/42
(52) U.S. Cl. ........................................................ 385/16
(58) Field of Search ............................. 385/16, 18, 17, 385/20–24, 47, 50, 41, 42, 116–121

(56) References Cited

U.S. PATENT DOCUMENTS

| 5,165,104 A | * | 11/1992 | Weverka ................... 385/14 |
| 5,835,458 A | * | 11/1998 | Bischel et al. .......... 369/112.27 |
| 5,969,848 A | * | 10/1999 | Lee et al. .................... 250/310 |
| 6,137,103 A | * | 10/2000 | Giles et al. ................. 250/216 |
| 6,304,703 B1 | * | 10/2001 | Lowry .......................... 345/32 |

* cited by examiner

Primary Examiner—Robert H. Kim
Assistant Examiner—Richard Kim

(57) ABSTRACT

A planar array of lenses are configured and independently translatable along in-plane X and Y axes by corresponding MEMS actuators such that a light beam emanating from the facet of a first selected optical fiber in an adjacent bundle of fibers can be deflected in a first predetermined manner by a first one of the lenses, reflected off of an adjacent co-planar mirror back to the array of lenses, and deflected in a second predetermined manner by a second one of the lenses and focused on the facet of a selected second optical fiber in the bundle. In an alternate embodiment, the planar mirror is replaced with a second array of MEMS actuated lenses so that light pulses from a selected optical fiber in an input bundle can be steered to a selected optical fiber in an output bundle.

23 Claims, 3 Drawing Sheets

OPTICAL SWITCH WITH MOVING LENSES

FIELD OF THE INVENTION

The present invention relates to telecommunications networks, and more particularly, to pure optical switches which direct light pulses from one optical fiber to another without electrical conversion.

BACKGROUND OF THE INVENTION

Telecommunications service providers continue to seek ever greater bandwidth at ever lower prices. Their data networks must be flexible to allow for continual upgrades, also referred to as "provisioning". They must also designed for rapid fault recovery to avoid service degradation and even outages. High speed optical data networks now carry most of the long haul, and much of the metropolitan area data traffic in developed countries. Along such networks microprocessor controlled routers perform so-called "OEO" transcriptions, converting optically encoded data received from input optical fibers to electrical signals, reading destination code, and then reconverting the electrical signals back to optically encoded data and sending it along output optical fibers. As transmission speeds pass 2.488 Gbits/sec (OC-48 level), this conversion step becomes more difficult to perform and the cost of conventional high throughput electrical switches becomes unacceptable.

Pure optical switches direct light pulses directly from one optical fiber to another without electrical conversion and therefore offer the promise of eliminating much of the OEO transcriptions in high bandwidth fiber optic data transmission networks. Electrical routing intelligence would still be needed to direct traffic. However, currently about eighty percent of the traffic handled by a conventional router passes straight through and reading the destination header in most cases is a waste of time and system resources. By separating the control information from the transmitted data, pure optical switching would bring substantial increases in the throughput rate of optical data networks.

A variety of miniature electromechanical devices have been developed for changing the path of light in free space to direct light pulses from one optical fiber to another optical fiber. One promising approach utilizes three dimensional (3D) microelectromechanical systems (MEMS). Generally speaking, MEMS fabrication technology involves shaping a multi-layer monolithic structure by sequentially depositing and configuring layers of a multi-layer wafer. The wafer typically includes a plurality of polysilicon layers that are separated by layers of silicon dioxide and silicon nitride. The shaping of individual layers is done by etching that is controlled by masks patterned by photolithographic techniques. MEMS fabrication technology also entails etching intermediate sacrificial layers of the wafer to release overlying layers for use as thin elements that can be easily deformed and moved. Further details of MEMS fabrication technology may be found in a paper entitled "MEMS The Word for Optical Beam Manipulation" published in *Circuits and Devices,* July 1997, pp. 11–18. See also "Multiuser MEMS Processes (MUMPS) Introduction and Design Rules" Rev. 4, Jul. 15, 1996 MCNC Mems Technology Applications Center, Research Triangle Park, N.C. 27709 by D. Keoster, R. Majedevan, A. Shishkoff and K. Marcus.

FIG. 1 is a diagrammatic illustration of a conventional 3D MEMS optical switch 10. A first array 12 of micro-machined mirrors is aligned with an input optical fiber bundle 14, and juxtaposed opposite a second array 16 of micro-machined mirrors. Electrical command signals from a switch controller (not illustrated) cause individual mirrors in the arrays 12 and 16 to tilt. Input light pulses transmitted through a selected fiber in the input bundle 14 that strike an individual mirror in the first array 12 can be directed to another specific mirror in the second array 16 and from that mirror to a selected fiber in an output optical fiber bundle 18 aligned with the second array 16. The individual light beams travel along Z-shaped paths 19 in free space. There is usually a lens (not illustrated) between the first and second mirror arrays 12 and 14. The purpose of this lens is to image the facets of the fibers in the input bundle 14 onto the facets of the fibers in the output bundle 18. Because the light beams coming out of the fibers in the input bundle 14 diverge, the lens is necessary to focus the light onto the fibers in the output bundle 18. In some cases, there are two lenses between the two arrays 12 and 14 to form a sort of telescope in order to accomplish this imaging. The optical switch 10 has distinct advantages over electrical switches in that the former operates completely independent of changes in the bit rate, wavelength and polarization.

3D MEMS optical switches are targeted for use in network cores and nodes in both long haul and metropolitan area data networks. 2D MEMS optical switches simply raise or lower pop-up mirrors at fixed angles to switch to a given data port. See for example U.S. Pat. No. 5,994,159 of Aksyuk et al. assigned to Lucent Technologies, Inc. and U.S. Pat. No. 6,097,859 of Sogarard et al. assigned to the Regents of the University of California. In the 3D MEMS optical switch of FIG. 1, optical signals are reflected by the first and second arrays 12 and 16 each made of micro-machined mirrors that can each be tilted variable amounts in two axes, bouncing an incoming optical signal from a selected optical fiber in the input bundle 14 to a selected optical fiber in the output bundle 18 in a manner that results in less signal loss than in 2D MEMS optical switches.

The 3D MEMS optical switch of FIG. 1 accommodates any data rate or transmission protocol and its architecture is more readily scalable than 2D MEMS optical switch designs. Larger switching capacities are achieved simply by doubling, rather than squaring, the number of mirrors needed for the desired channel count. 2D MEMS optical switches are really not practical beyond a 32×32 matrix. 3D MEMS optical switches have been commercially announced that offer a 64×64 input/output capacity in a relatively small form factor. They have high cross-talk rejection and flat passband response and are well suited for use in wavelength-division multiplexed (WDM) optical data networks.

While 3D MEMS optical switches show great promise, it would be desirable to provide an alternate architecture for a large capacity pure optical switch that does not rely on arrays of two-axis tilting micro-machined mirrors. Precise angular alignment of these miniature mirrors can be difficult to achieve. Such a switch would need to exhibit similar high cross-talk rejection and flat passband response.

SUMMARY OF THE INVENTION

It is therefore the primary object of the present invention to provide a large capacity pure optical switch which does not rely on twin arrays of two-axis tilting micro-machined mirrors.

In accordance with a first embodiment of the present invention, an optical switch includes an array of optical fibers having a plurality of facets lying in a first plane. An array of lenses is formed in a second plane spaced from, and generally parallel to, the first plane. There is one lens corresponding to each fiber for receiving and focusing light beams emanating from the array of optical fibers. A plurality of actuators are provided for each independently translating a corresponding lens a predetermined amount within the second plane along an X axis and a Y axis. A mirror is spaced from, and generally parallel to, the second plane. The lenses are configured and translatable by their actuators such that a light beam emanating from the facet of a first selected optical fiber in the array of optical fibers can be deflected in a first predetermined manner by a first one of the lenses, reflected off of the mirror back to the array of lenses, and deflected in a second predetermined manner by a second one of the lenses and focused on the facet of a selected second optical fiber.

In accordance with a second embodiment of the present invention an optical switch includes a first array of optical fibers having a plurality of facets lying in a first plane. A first array of lenses is formed in a second plane spaced from, and generally parallel to, the first plane. There is one lens in the first array of lenses corresponding to each fiber of the first array of fibers for receiving and focusing light beams emanating from the first array of optical fibers. A first plurality of actuators each independently translate a corresponding lens of the first array a predetermined amount within the second plane along an X axis and a Y axis of the second plane. A second array of lenses is formed in a third plane spaced from, and generally parallel to, the second plane. A second plurality of actuators each independently translate a corresponding lens of the second array a predetermined amount within the third plane along an X axis and a Y axis of the third plane. A second array of optical fibers has a plurality of facets lying in a fourth plane spaced from, and generally parallel to, the third plane. The lenses of the first and second arrays are configured and translatable by their actuators such that a light beam emanating from the facet of a first selected optical fiber in the first array of optical fibers can be deflected in a first predetermined manner by a first lens in the first array of lenses and focused on a second lens in the second array of lenses, and deflected in a second predetermined manner by the second lens and focused on the facet of a second selected optical fiber in the second array of optical fibers.

DESCRIPTION OF THE PREFERRED EMBODIMENTS

Figure 1:
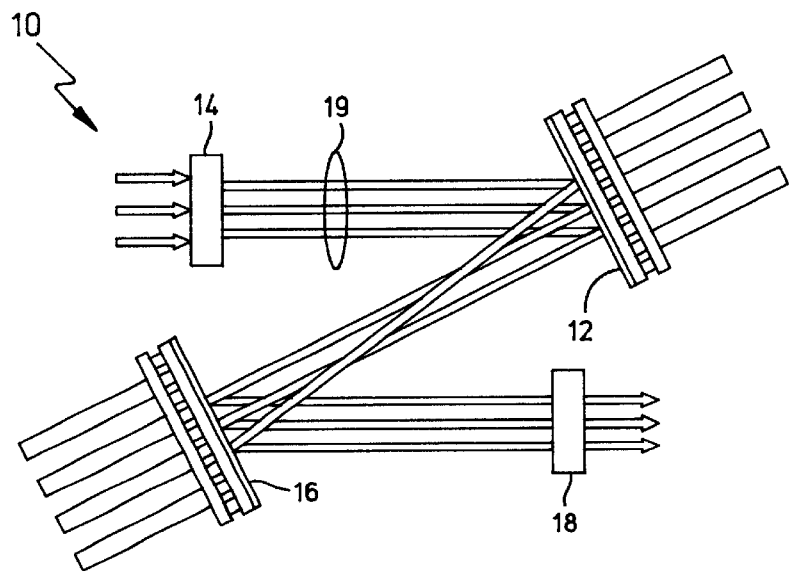
FIG. 1 is a diagrammatic side elevation view illustrating a conventional 3D MEMS optical switch.
Figure 2:
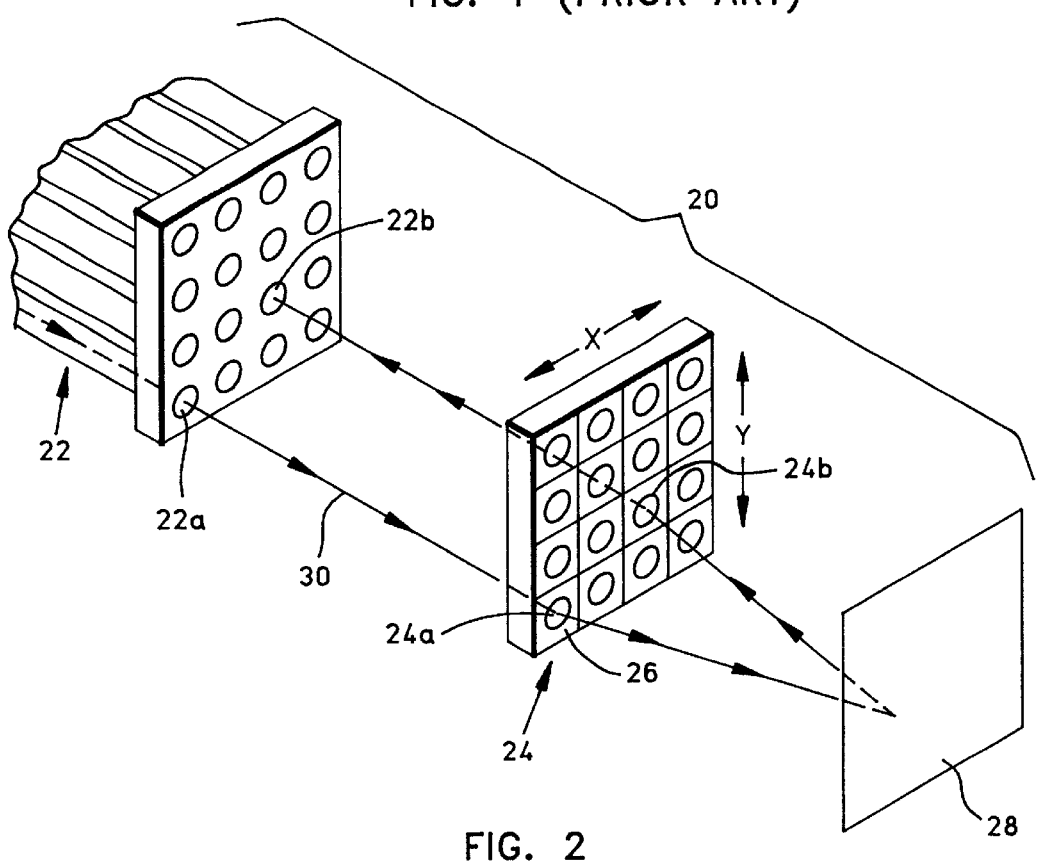
FIG. 2 is a diagrammatic isometric view illustrating a first embodiment of a pure optical switch utilizing moving lenses in accordance with a first embodiment of the present invention.

Referring to FIG. 2, a pure optical switch 20 constructed in accordance with a first embodiment of my invention includes a 2D rectangular 4×4 array or bundle 22 of optical fibers with co-planar end faces or facets that lie in a common plane. The optical fibers of the bundle 22, such as 22a, are each conventional in material and dimensions. For example, they are made of a highly pure single-mode glass core with a nine micro-meter diameter surrounded by a glass cladding having an index of refraction which is a step below that of the core. A rectangular 4×4 array 24 of lenses is formed in a second parallel plane, spaced from the co-planar end faces of the bundle 22. The number of individual lenses in the array 24 is equal to the number of optical fibers in the bundle 22. Each lens, such as 24a, can translate independently in either the X or Y axes of the plane of the lens array 24. Such translation is accomplished by a plurality of linear MEMS translation actuators 26.

Each lens 24a (FIG. 2) is configured such that a waist (focus) of a beam of light is formed at a third plane where a rectangular planar mirror 28 is located which is parallel to, and spaced from the plane of the lens array 24. By moving each lens, such as 24a, a predetermined offset distance, a beam 30 emanating from the fiber 22a can be deflected in a predetermined manner such that following reflection from the planar mirror 28, the beam 30 impinges on another lens 24b in the lens array 24. The lens 22b is moved a predetermined offset and the beam 30 is refocused onto the facet of another optical fiber 22b in the bundle 22. Thus light pulses emanating from any fiber in the bundle 22 can be directed to, and imaged into any other fiber in the bundle 22.

The lenses in the array 24 can be diffractive optical elements in the form of Fresnel zone plate micro-lenses or multiple-level binary micro-lenses, both of which can be readily constructed as diffractive optical elements formed in a multi-layer monolithic silicon structure by conventional photolithographic techniques. Alternatively the lenses in the array 24 can be refractive optical elements. A refractive lens has the advantage of being less sensitive to wavelength variations than the diffractive lens, making it more suitable for use in WDM optical data networks.

The lenses of the array 24 and the actuators 26 are preferably formed together as MEMS surface micromachines. Each lens of the array 24 is independently translatable in the plane of the array along the X and Y axes. Thus the light passed through each of these lenses can be redirected in such a manner that it bends at two different angles. The lenses of the array 24 could also be separately formed via a non-MEMS process and attached to a silicon substrate. The linear MEMS actuators 26 that translate the lenses in the array 24 could be micro-steppers, or they could be some other type of actuator such as a piezo-electric transducer or electro-static comb drive.

One advantage of my pure optical switch 20 lies in the fact that it utilizes linear MEMS translation actuators 26 rather than tilt actuators used in conventional 3D MEMS optical switches. Linear MEMS translation actuators are easier to control and allow the state of the control switch to be stable if power is turned OFF. Tilt actuators require precise, repeatable minute angular alignments.

Figure 3:
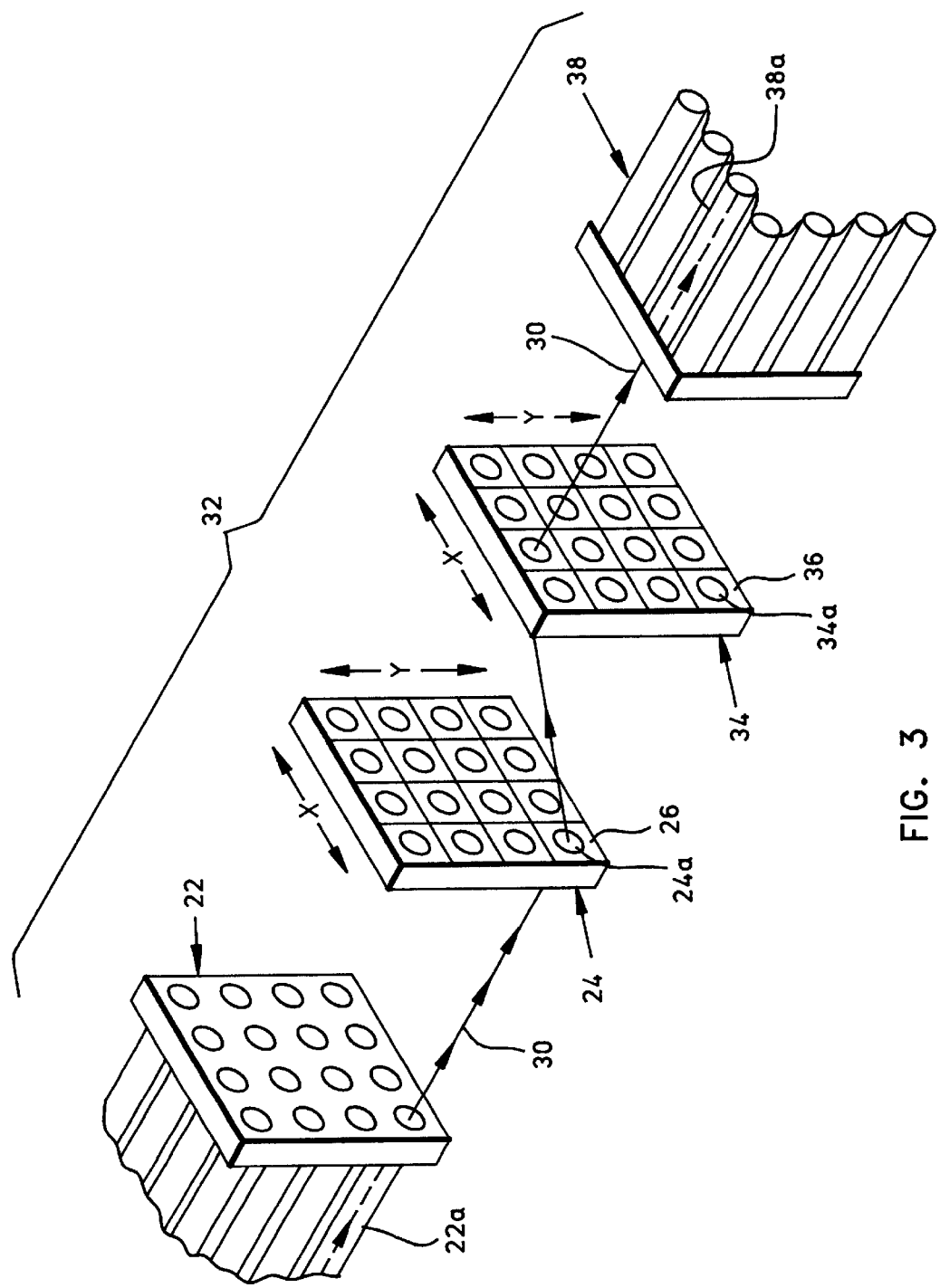
FIG. 3 is a diagrammatic isometric view illustrating a second embodiment of the present invention.

Referring to FIG. 3, an alternate embodiment in the form of a pure optical switch 32 is similar to the switch 20 except that the planar mirror 28 is replaced with a second rectangular planar 4×4 array 34 of lenses each translatable along the X and Y axes by corresponding linear MEMS translation actuators 36. Another 4×4 rectangular array or bundle 38 of optical fibers with co-planar end faces or facets is positioned for receiving the beam 30 of encoded light pulses transmitted through the second lens array 34. The beam 30 emanating from any selected input fiber, such as 22a, in the input bundle 22 can be steered by appropriately translating predetermined individual lenses such as 24a and 34a in the arrays 24 and 34 to any selected output fiber, such as 38a, in the output bundle 38. Preferably each lens of the array 34 couples light to the corresponding fiber in the output bundle 38. That is to say, the light passing through the lens in row 1, column 2, is directed to the facet of the output fiber 38a at row 1, column 2 of the output bundle 38.

Those skilled in the art will appreciate that the switches 20 and 32 each require electronic control circuits to generate the appropriate command signals that are applied to the MEMS actuators 26 and 36 to switch the incoming light pulses to the appropriate output fibers. The design of such electronic control circuits is well known and need not be described herein in detail since control circuits do not form part of the switches themselves.

Figure 4A:
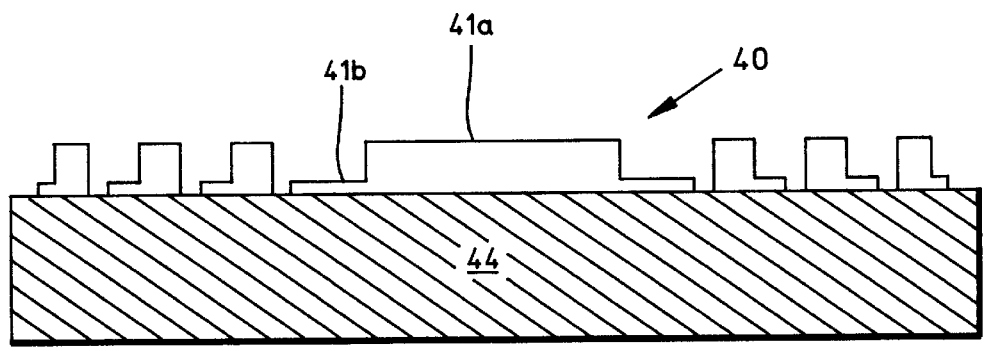
FIGS. 4A and 4B are greatly enlarged schematic diagrams illustrating a diffractive Fresnel zone-plate lens and a diffractive multiple-level binary micro-lens, respectively, that may be utilized in either embodiment.
Figure 4B:
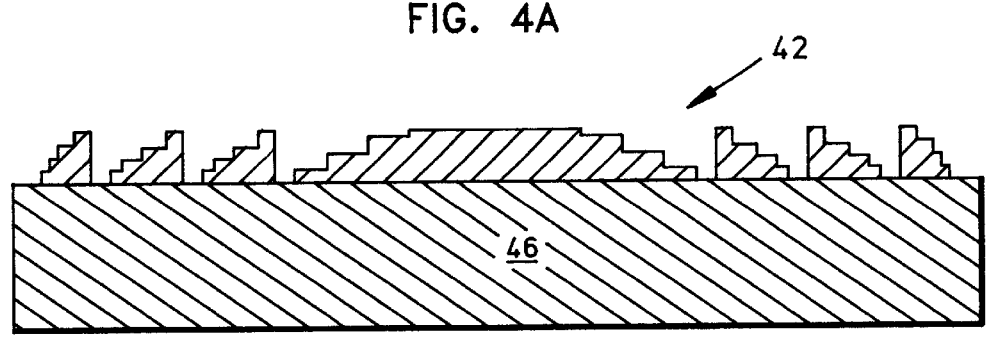

FIGS. 4A and 4B are schematic diagrams illustrating a Fresnel zone-plate lens 40 and a multiple-level binary micro-lens 42. Each of these diffractive micro-lenses can be fabricated on movable polysilicon plates 44 and 46, respectively with structural layers of one micron or less in thickness using well known surface micro-machining processes. The Fresnel zone-plate lens 40 has radially spaced apart, alternating thick and thin transmission zones such as 41a and 41b. The thicknesses of the zones 41a and 41b are selected so that their transmissive bandwidth differs by one-half wavelength of the light passing through the same ($\pi 1$ radians of phase) While the Fresnel zone plate lens 40 is easier to fabricate, its efficiency is significantly less than that of the multiple-level binary micro-lens 42.

Figure 5:
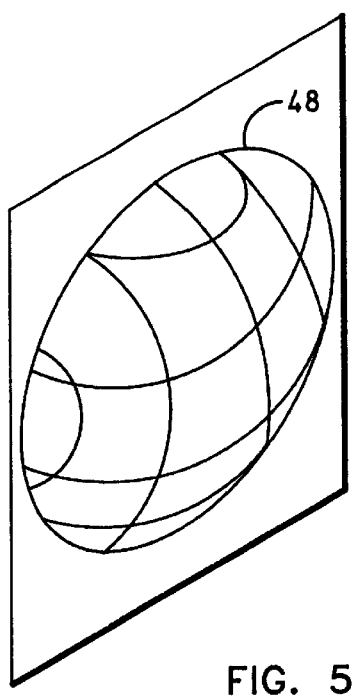
FIG. 5 is a greatly enlarged schematic diagram illustrating a refractive micro-lens that can be used in either embodiment.

FIG. 5 illustrates a refractive micro-lens 48 that can be fabricated in arrays on semiconductor and dielectric substrates with conventional photolithographic techniques. The refractive micro-lens 48 has several advantages over the diffractive micro-lenses 40 and 42. The focal length of the refractive micro-lens 48 is independent of the optical wavelength, except for a weak dependence due to dispersion of the lens material. It is also easier to fabricate the refractive micro-lens 48 without tight critical dimension control. The refractive micro-lens 48 does not suffer from diffraction loss. Therefore it is easier to make a miniature high efficiency lens at low cost using the refractive micro-lens 48 as a model. By way of contrast, the diffractive micro-lenses 40 and 42 are much less efficient, depend upon the light frequency and require multiple critical lithography steps.

Details of the techniques for fabricating the diffractive micro-lenses 40 and 42 and the refractive micro-lens 48 may be found in "Micromachining for Optical and Optoelectronic Systems" by Ming C. Wu, PROCEEDINGS OF THE IEEE, VOL. 85, No. 11, November, 1997 and in U.S. Pat. No. 5,646,928 of Wu et al., assigned to The Regents of the University of California, the entire disclosure of which is hereby incorporated by reference.

Figure 6:
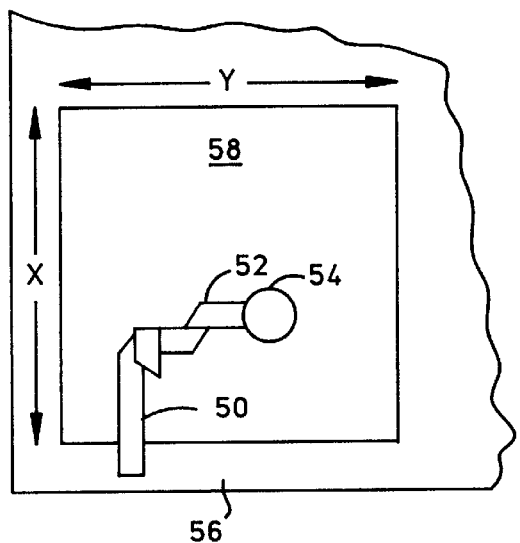
FIG. 6 is a greatly enlarged fragmentary view that diagrammatically illustrates a pair of linear MEMS translation actuators that independently translate a micro-lens a predetermined amount along X and Y axes.

FIG. 6 diagrammatically illustrates a pair of cantilevered linear MEMS translation actuators 50 and 52 that independently translate a micro-lens 54 a predetermined amount within the plane of a lens array (not shown in this figure) along its X and Y axes. The outer end of the linear MEMS translation actuator 52 is directly coupled to, and supports, the micro-lens 54. The outer end of the MEMS translation actuator 50 carries the inner end of the MEMS translation actuator 52. The inner end of the linear MEMS translation actuator 50 is connected to a support frame 56 having a rectangular opening 58 sized to accommodate the linear MEMS translation actuators 50 and 52 and the micro-lens 54. Movement along both the X and Y axes is achieved by mounting the linear MEMS translation actuator 52 on top of the outer movable end of the linear MEMS translation actuator 50. See U.S. Pat. Nos. 6,075,239 of Aksyuk et al. and 6,205,267 of Aksyuk et al., both assigned to Lucent Technologies, Inc. for further details about the fabrication of the linear MEMS translation actuators 50 and 52, the entire disclosures of which are hereby incorporated by reference.

A micro-machined actuator utilizing a levitational force, such as an electrostatic comb drive, could also be utilized for the translation actuators that operate to move the lenses along the vertical or Y dimension. See, for example, U.S. Pat. No. 5,969,848 of Lee et al., assigned to The Regents of the University of California, the entire disclosure of which is hereby incorporated by reference. Alternatively, in a hybrid approach (not illustrated) each lens can be translated by a combination of a MEMS actuator and a piezo-electric transducer.

While I have described two embodiments of my pure optical switch that does not require two-axis tilting micro-machined mirrors, it should be apparent to those skilled in the art that my invention can be modified in both arrangement and detail. For example, the array size can be substantially enlarged beyond 4×4 and the number of input fibers does not need to equal the number of output fibers. Polymers could also be used instead of micro-machined structures to position the lenses. See U.S. Pat. No. 6,169,827 of Holman et al., the entire disclosure of which is hereby incorporated by reference. The embodiment of FIG. 3 could be configured as a 1×N switch in which case there would only be a single input optical fiber and a single translatable lens in place of the array 24. Therefore, the protection afforded my invention should only be limited in accordance with the scope of the following claims.

I claim:

1. An optical switch, comprising:
   a array of optical fibers having a plurality of facets lying in a first plane;
   an array of lenses formed in a second plane spaced from, and generally parallel to, the first plane, there being one lens corresponding to each fiber for receiving and focusing light beams emanating from the array of optical fibers;
   a plurality of actuators that each independently translate linearly and orthogonally a corresponding lens a predetermined amount within the second plane along an X axis and a Y axis;
   a mirror spaced from, and generally parallel to, the second plane; and
   the lenses being configured and translatable linearly and orthogonally by their actuators such that a light beam emanating from the facet of a first selected optical fiber in the array of optical fibers can be deflected in a first predetermined manner by a first one of the lenses, reflected off of the mirror back to the array of lenses, and deflected in a second predetermined manner by a second one of the lenses and focused on the facet of a second selected optical fiber.

2. The optical switch of claim 1 wherein the actuators are MEMS actuators.

3. The optical switch of claim 1 wherein each lens is a micro-lens fabricated with photolithographic techniques.

4. The optical switch of claim 1 wherein the lenses are diffractive optical elements.

5. The optical switch of claim 1 wherein the lenses are refractive optical elements.

6. The optical switch of claim 1 wherein the lenses are separately formed before being attached to a silicon substrate.

7. The optical switch of claim 1 wherein the actuators are formed with polymers.

8. The optical switch of claim 1 wherein the actuators are selected from the group consisting of piezo-electric transducers, electrostatic comb drives and MEMS micro-steppers.

9. The optical switch of claim 1 wherein the lenses and the actuators are both formed together as MEMS surface micro-machines.

10. The optical switch of claim 1 wherein the lenses are selected from the group consisting of a diffractive Fresnel zone-plate micro-lens, a diffractive multiple-level binary micro-lens and a refractive micro-lens.

11. An optical switch, comprising:
a first array of optical fibers having a plurality of facets lying in a first plane;
a first array of lenses formed in a second plane spaced from, and generally parallel to, the first plane, there being one lens in the first array of lenses corresponding to each fiber of the first array of fibers for receiving and focusing light beams emanating from the first array of optical fibers;
a first plurality of actuators that each independently translate linearly and orthogonally a corresponding lens of the first array a predetermined amount within the second plane along an X axis and a Y axis of the second plane;
a second array of lenses formed in a third plane spaced from, and generally parallel to, the second plane;
a second plurality of actuators that each independently translate linearly a corresponding lens of the second array a predetermined amount within the third plane along an X axis and a Y axis of the third plane;
a second array of optical fibers having a plurality of facets lying in a fourth plane spaced from, and generally parallel to, the third plane; and
the lenses of the first and second arrays being configured and translatable linearly and orthogonally by their actuators such that a light beam emanating from the facet of a first selected optical fiber in the first array of optical fibers can be deflected in a first predetermined manner by a first lens in the first array of lenses and focused on a second lens in the second array of lenses, and deflected in a second predetermined manner by the second lens and focused on the facet of a second selected optical fiber in the second array of optical fibers.

12. The optical switch of claim 11 wherein the actuators are MEMS actuators.

13. The optical switch of claim 11 wherein each lens is a Fresnel zone-plate lens.

14. The optical switch of claim 11 wherein the lenses are diffractive optical elements.

15. The optical switch of claim 11 wherein the lenses are refractive optical elements.

16. The optical switch of claim 11 wherein the lenses are separately formed before being attached to a silicon substrate.

17. The optical switch of claim 11 wherein the actuators are formed with polymers.

18. The optical switch of claim 11 wherein the actuators are selected from the group consisting of piezo-electric transducers, electrostatic comb drives and MEMS micro-steppers.

19. The optical switch of claim 11 wherein the lenses and the actuators of each corresponding array are both formed together as MEMS surface micro-machines.

20. The optical switch of claim 11 wherein the first and second arrays of optical fibers have an equal number of optical fibers.

21. An optical switch, comprising:
an input optical fiber;
a first lens positioned to receive and focus a light beam emanating from the input optical fiber;
a first actuator that translates linearly and orthogonally the first lens along an X axis and a Y axis of a first plane;
an array of second lenses spaced from the first lens and lying in a second plane generally parallel to the first plane;
a second plurality of actuators that each independently translate linearly and orthogonally a corresponding second lens of the array a predetermined amount within the second plane along an X axis and a Y axis of the second plane;
an array of output optical fibers having a plurality of facets lying in a third plane spaced from, and generally parallel to, the second plane; and
the lenses being configured and translatable linearly and orthogonally by their actuators such that a light beam emanating from a facet of the input optical fiber can be deflected in a first predetermined manner by the first lens and focused on a selected second lens in array of lenses, and deflected in a second predetermined manner by the selected second lens and focused on the facet of a selected output optical fiber.

22. An optical switch, comprising:
a array of optical fibers having a plurality of facets lying in a first plane;
an array of lenses formed in a second plane spaced from, and generally parallel to, the first plane, there being one lens corresponding to each fiber for receiving and focusing light beams emanating from the array of optical fibers;
a plurality of actuators that each independently non-rotatably translate a corresponding lens a predetermined amount within the second plane along an X axis and a Y axis;
a mirror spaced from, and generally parallel to, the second plane; and
the lenses being configured and non-rotatably translatable by their actuators such that a light beam emanating from the facet of a first selected optical fiber in the array of optical fibers can be deflected in a first predetermined manner by a first one of the lenses, reflected off of the mirror back to the array of lenses, and deflected in a second predetermined manner by a second one of the lenses and focused on the facet of a second selected optical fiber.

23. An optical switch, comprising:
an input optical fiber;
a first lens positioned to receive and focus a light beam emanating from the input optical fiber;
a first actuator that non-rotatably translates the first lens along an X axis and a Y axis of a first plane;
an array of second lenses spaced from the first lens and lying in a second plane generally parallel to the first plane;
a second plurality of actuators that each independently non-rotatably translate a corresponding second lens of the array a predetermined amount within the second plane along an X axis and a Y axis of the second plane;
an array of output optical fibers having a plurality of facets lying in a third plane spaced from, and generally parallel to, the second plane; and
the lenses being configured and non-rotatably translatable by their actuators such that a light beam emanating from a facet of the input optical fiber can be deflected in a first predetermined manner by the first lens and focused on a selected second lens in array of lenses, and deflected in a second predetermined manner by the selected second lens and focused on the facet of a selected output optical fiber.

* * * * *